Patented Nov. 13, 1928.

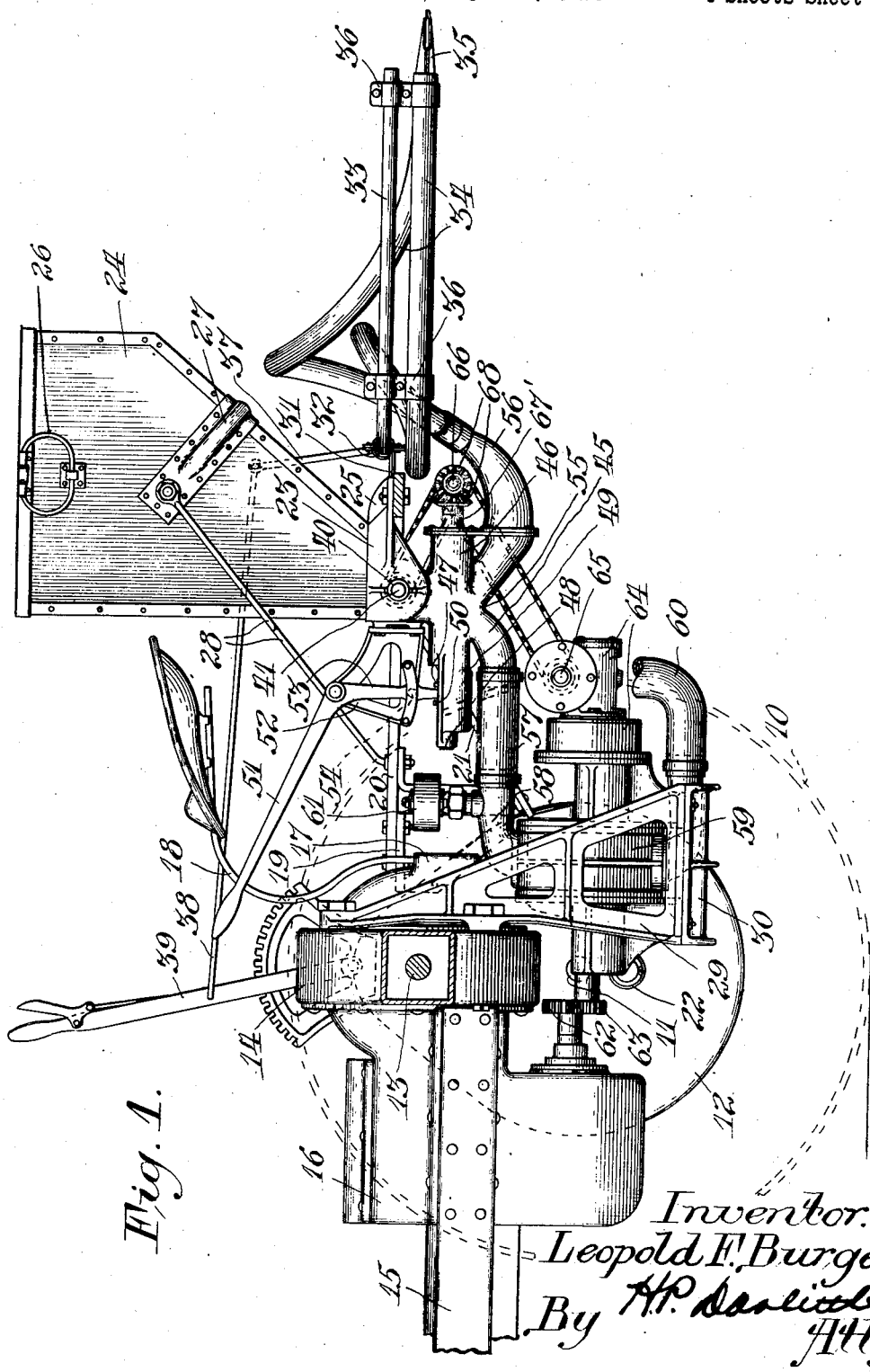

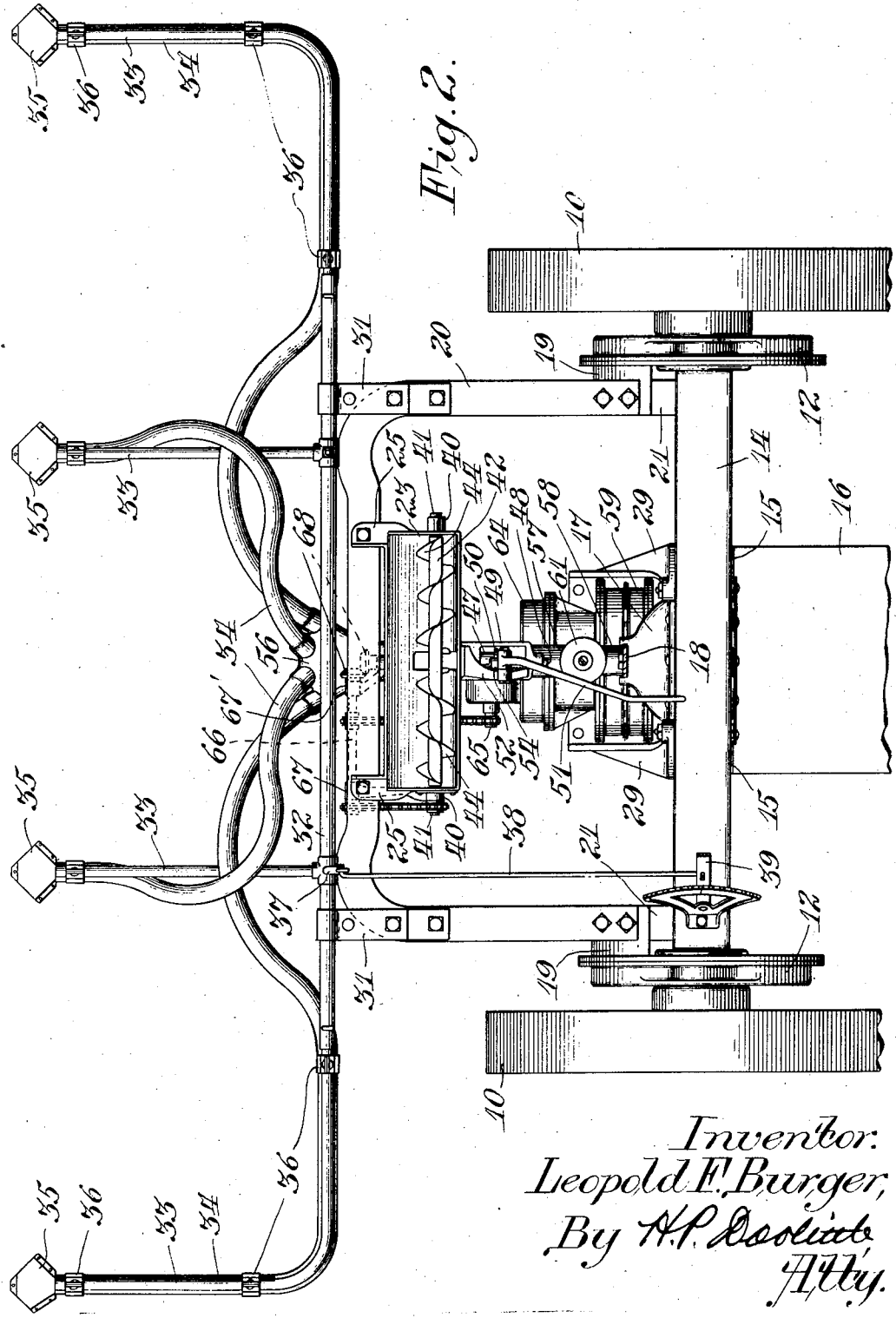

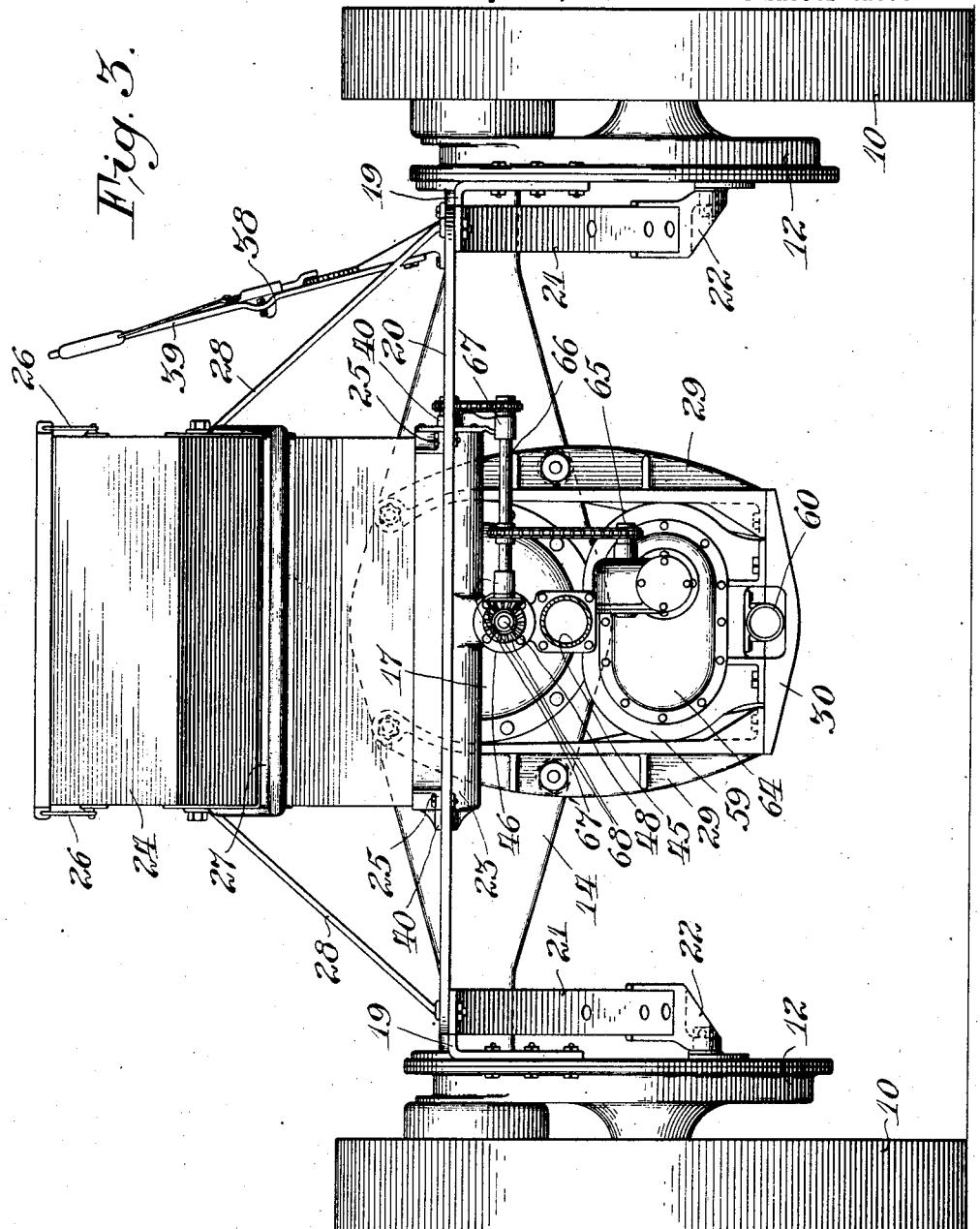

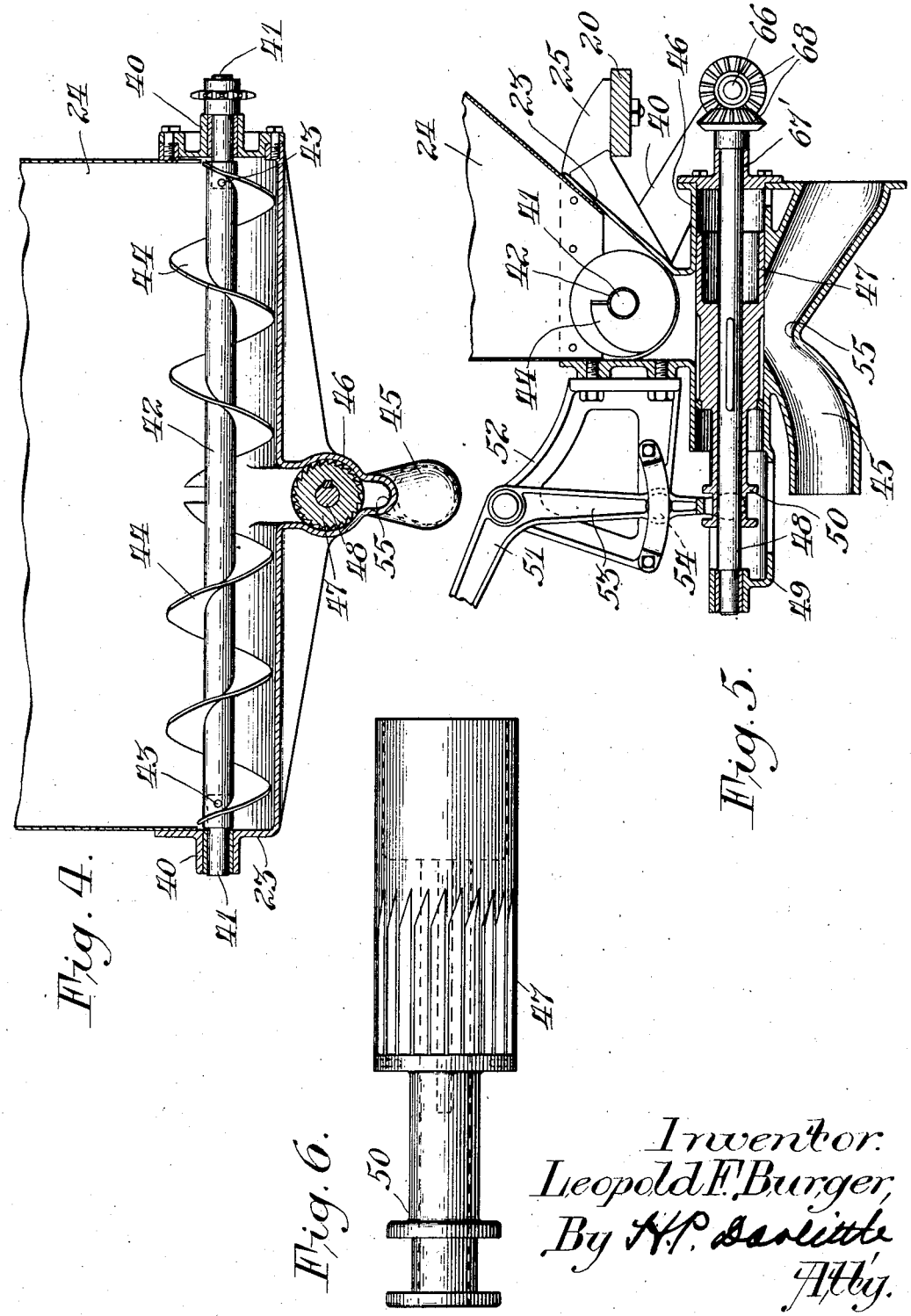

1,691,563

UNITED STATES PATENT OFFICE.

LEOPOLD F. BURGER, OF RIVERSIDE, ILLINOIS, ASSIGNOR TO INTERNATIONAL HARVESTER COMPANY, OF CHICAGO, ILLINOIS, A CORPORATION OF NEW JERSEY.

POWDER-DUSTING MACHINE.

Application filed April 9, 1924. Serial No. 705,164.

The invention relates to dusting machinery and especially to a wheeled type of machine adapted to travel along rows of growing plants and discharge a poisonous dust or powder thereon for the purpose of killing any plant destroying parasites, such for example as the boll-weevil in the case of cotton plants.

Previous machines of this type were not entirely satisfactory from a commercial viewpoint because they failed to direct a uniform stream of dust to the discharge nozzles with which such machines are provided, nor could the stream of dust be controlled effectively to meet varying conditions.

The principal objects of this invention are, therefore, to provide in a machine of the type mentioned an improved dust feeding mechanism; to provide an efficient and effective control therefor; and in general to improve machines of this type so that the same shall be available for successful commercial use.

These objects are attained by the machine of the present invention which comprises briefly a dust containing hopper having a discharge opening in its bottom, a feeder in the hopper which feeds the dust to the opening mentioned, an axially adjustable, rotatable plug being disposed below the opening to cut away the powder and direct it to a discharge conduit where an air stream may blow the powder along to discharge nozzles and thence upon the plants. Suitable driving means is provided to operate these parts.

The machine is disclosed in the accompanying sheets of drawings, like characters of reference designating like parts, and wherein—

Fig. 1 is a side elevational view of a tractor and the improved dusting mechanism supported thereon;

Fig. 2 is a similar view, but showing the machine in plan;

Fig. 3 is a rear elevational view, the discharge nozzles being removed for clarity of illustration;

Fig. 4 is a detail sectional rear view of the hopper and the feeding mechanism associated therewith;

Fig. 5 is a detail sectional side view of the hopper and feeding mechanism and the control therefor; and Fig. 6 is a detail of the feeding cutter plug.

The preferred embodiment of the invention has been illustrated in the drawings in association with a tractor. The tendency in modern agricultural operations is to rely more and more upon tractors for the efficient operation of farm machines, and it has, therefore, been thought best to illustrate the machine of the present invention in association with a tractor. The tractor shown in Figs. 1, 2 and 3 comprises rear propelling wheels 10 having stub axles 11 which are driven by operative connections contained in gear casings 12, these operative connections being driven from the shafts 13 which in turn are operated by a conventional differential mechanism contained centrally within the housing 14. Suitably fixed to the differential housing and substantially centrally thereof, is a pair of forwardly and longitudinally extending tractor side frame members 15 which support a transmission and power take-off assembly 16. The differential housing on its rear side is provided with a cover plate 17 which also functions as an anchoring means for a seat spring 18 carrying the conventional seat for the operator of the tractor. Each of the gear casings 12 of the tractor is provided near its upper end with a triangularly shaped bracket 19 suitably bolted thereto. These brackets function to support a U-shaped frame member 20 extending rearwardly of the tractor a substantial distance. The rear end or bight portion of this U-shaped member is supported by brace members 21 suitably bolted thereto and which extend downwardly and forwardly parallel to the gear casings 12 and attached thereto by brackets 22. Disposed transversely across the rear end of the U-shaped member 20 is a rectangularly shaped bed plate 23 which serves as a support and bottom for a dust containing hopper 24. This bed plate, it will be observed, is bolted to the bight of the U-shaped member by means of integral rearwardly extending brackets 25. The hopper is provided with a cover which may be clamped to the sides of the hopper by any suitable form of clamping means 26. The discharge opening of the hopper is at its bottom and so the hopper is accordingly provided with a rear, inclined wall which thus functions after the manner of a chute, that is, the material of its own weight is directed to the bottom opening. This rear inclined wall is provided with a metallic strap 27 which overlaps the side walls of the hopper, and, being fastened thereto, makes for a very sturdy and rigid construction. Tie rods or trusses 28 may be provided on opposite sides of the hopper for further supporting it on the U-shaped frame member.

Sturdy, depending, triangularly shaped castings 29 are bolted to the differential housing in spaced relation on the rear side thereof. The lower ends of these members 29, which extend considerably below the plane of the U-shaped frame member, above described, are connected by means of a plate 30 suitably bolted thereto and form a table or platform for supporting a blower mechanism to be hereinafter described.

The rear end of the U-shaped frame member carries rearwardly extending clips 31 for supporting a rockable shaft or pipe 32, which extends through suitable journals in these clips 31 and laterally of the machine, as shown clearly in Fig. 2. The rockable pipe 32 is provided with rearwardly extending supporting members 33 which are adapted to support conventional flexible conduits or hose members 34, each of which leads to a discharge nozzle 35. The hose members 34 are supported on the rearwardly extending members 33 by means of depending clips 36. By means of an arm 37 rigidly fixed to the pipe 32 and a pull-link 38 connected to the arm at one end and to a suitable lever 39 at the other end and supported on the differential housing, the supporting members 32 and 33, and consequently the hose members and nozzles, may be rocked or lifted in a vertical plane to various positions of adjustment to accommodate the discharge nozzles to any height of growing plants.

The feeding and discharging mechanisms for the dust contained in the hopper will next be described.

The opposite side ends of the bed plate member 23 forming the bottom of the hopper are provided with journals or bearing members 40 which rotatably receive (see Fig. 4) stub shafts 41 which extend slightly inwardly of the side walls of the hopper where they are telescoped into a hollow shaft 42 and held for rotation therewith by means of pins 43. The shaft 42 is provided on opposite sides of its median portion with opposed spiral or screw feeding members 44, which, when rotated, feed the material in the hopper toward the center thereof. Disposed at right angles to or longitudinally with respect to the transversely disposed hopper and below the plane of the bottom thereof, is a discharging conduit 45 which communicates with a bottom opening in the hopper by means of a circular chamber 46. The circular chamber 46 is elongated in the form of a cylinder and houses a rotatable cutting member 47 keyed to, but slidably arranged, on a shaft 48. This cutting member substantially fills the space provided by the chamber 46 and has cut into its periphery for a portion of its effective length, a series of longitudinally cut grooves providing teeth inclined in the same direction to the radius of the cylinder, thus forming in effect a cutting member very much after the fashion of a milling cutter. It will thus be appreciated that as the member is rotated it will cut into the material which is being fed to the center of the hopper by the screw feeders in a manner to fill the grooves between the teeth, and so deliver the dust or material through an arc of 180 degrees, where it will be fed to the discharge conduit 45. The forward end of the housing 46 is provided with an extension 49 which receives a reduced integral extension and collar portion 50 of the cylindrical cutting plug.

In dusting machinery heretofore employed the machines were not entirely commercially successful for the reason that the delivery of the material or dust from the hopper to the discharging conduit could not be varied at the will of the operator to meet varying conditions. It is highly desirable, therefore, that some means be provided for varying the discharge of material from the hopper. Applicant accomplishes this very desirable result by means of a lever 51 arranged adjacent the operator's seat on the tractor and fulcrumed in a bracket 52 bolted to the forward side of the casting 23 forming the bottom of the hopper. A bell crank 53 is integrally fitted as an extension of the lever 51 and has a portion engaging through a slot in the extended housing 49 to engage the collar 50 for shipping or sliding the cylindrical cutting plug axially of its driving shaft 48. Any suitable detent means, such as that diagrammatically shown at 54, may be provided for locking the lever 51 in any of a number of various positions of adjustment. The idea, thus, is that, if the operator wishes a greater amount of dust to be delivered to the discharge conduit, he exposes a greater amount of cutting surface of the cylindrical plug to the opening in the bottom of the hopper; and, vice versa, if he desires a smaller flow of material from the hopper, he exposes a smaller cutting surface of the cylindrical cutting plug to the material in the hopper. This is a very desirable feature and contributes greatly to the successful operation of this feeding mechanism. Or, the operator may momentarily cut off the discharge of material from the hopper by exposing the right hand smooth surface of the cutter, as shown in Fig. 6, without having to stop the driving connections of any of the parts.

It will be observed that the conduit 45 directly at the point of discharge of the cutting plug 47 is constricted in diameter to form a venturi 55, the rear end of which is coupled by a cluster-like member 56 to the discharge hose members 34. The forward end of the venturi is coupled by a length of flexible tubing 57 to the outlet pipe 58 of a blower, preferably a pressure blower, housed within a casing 59 and secured by suitable bolts to the platform 30. A breather or intake pipe 60 is provided for the blower contained within the housing 59. A relief valve 61 is also provided in the outlet pipe 58.

In machines of this general type heretofore employed the operative mechanisms thereof were driven from traction wheels of a horse-drawn implement. The result was that, due to slippage and poor traction, the mechanism was not operated at a uniform speed. This difficulty is overcome in the present invention by utilizing the power take-off of the tractor for imparting a uniform speed of rotation to all of the operative parts of the dusting mechanism. Extending rearwardly of the transmission and power take-off assembly 16 of the tractor is a shaft carrying a gear 62 meshing with a pinion 63 which rotates the shaft carrying the fan comprising the blower mechanism within the casing 59. This shaft, it will be understood, is extended rearwardly through the blower mechanism into the gear casing 64, housing suitable reduction gearing for imparting rotation to a shaft 65, which is operatively connected by a sprocket and chain to a transversely arranged shaft 66 rotatably journaled in brackets 67 and 67' carried by the hopper bottom casting 23 and housing 46, respectively. The inner bracket 67', as clearly shown in Fig. 2, also rotatably supports the shaft 48 disposed at a right angle to the shaft 66 and which imparts rotation to the cutting plug 47 by means of bevel gearing 68. The outer end of this shaft 66 is operatively connected by means of a chain and sprocket to one of the stub shafts 41 for imparting rotation to the screw conveyor in the bottom of the hopper.

A résumé of the operation of the above described machine follows:

The hopper, by means of its cover, is filled with any poisonous dust, preferably calcium arsenate, which is now cheap and available in commercial quantities. The tractor is then started and the power take-off thrown into operation, which thereupon drives the blower and impels a uniform blast of air through the outlet 58, tube 57, venturi 55, and thence through the cluster 56 and out at the nozzles, which are adjusted at a proper working elevation by means of the lever 39 to conform to the height of the growing rows of plants. By means of the driving connection described and particularly the gearing contained within the casing 64, rotation is imparted to the shaft 66 which is operatively connected to drive both the cylindrical cutting plug and the screw feeder in the bottom of the hopper. This screw feeder when in operation is constantly moving the powder in the hopper toward the center where it cakes or packs above the rotatable cutter. The cutter by means of the lever 51 is adjusted axially of its length and exposed more or less to the powder through the opening in the bottom of the hopper and cuts into it and fills the grooves in its periphery with powder, which is then carried in a clockwise direction to the venturi 55, as viewed in Fig. 4. A strong and uniform blast of air, it will be remembered, is passing through this discharging conduit of which the venturi is a part. The powder either drops into the venturi and is blown out through the nozzles, or is blown out of the grooves in the cutter and so carried through the nozzles. A further advantageous feature of this Venturi construction is that it has a tendency to draw the powder out of the grooves by its aspirating effect thereon, as the constricted diameter of the venturi materially increases the velocity of the blast of air at this point.

It is to be understood that the form of the invention herewith shown and described is to be taken as a preferred example of the same and that various changes in the shape, size and general disposition of the parts may be resorted to without departing from the spirit of the invention as indicated in the scope of the appended claims.

What is claimed is:

1. A dusting machine having in combination, a frame, a hopper supported thereon and provided with an opening in its bottom, feeding means in the hopper for feeding material therein to the opening; a chamber below the opening communicating with the hopper, a cutting tool in the chamber for cutting into and discharging the material from the hopper, and means for adjusting said cutting tool to vary the quantity of material discharged thereby.

2. A dusting machine having in combination, a frame, a hopper supported thereon and provided with an opening centrally disposed in its bottom, a feeding member in the hopper arranged on each side of the opening for feeding material in the hopper thereto, and an adjustable and rotatable cutting tool arranged below the opening to take the material therefrom and discharge the same.

3. A dusting machine having in combination, a frame, a hopper supported thereon and provided with an opening in its bottom, horizontally disposed means in the hopper for moving the material to the opening, a rotatable member adjacent the opening and below the hopper for cutting into and discharging material from said hopper, and means for adjusting said rotatable member for varying the amount of material discharged from the hopper.

4. A dusting machine having in combination, a frame, a hopper supported thereon and provided with an opening centrally disposed in its bottom, horizontally disposed means in the hopper for moving the material in the hopper from the sides to the opening, a rotatable member adjacent the opening for cutting into and discharging material from the hopper, and means for adjusting the rotatable member with respect to the opening for varying the amount of material cut into and discharged from said hopper.

5. A dusting machine having in combination, a frame, a hopper transversely supported on the frame and provided with an opening in its bottom, horizontally disposed means in the hopper for moving material to the opening, a longitudinally disposed rotatable cylindrical member adjacent said opening and below the hopper for cutting into and discharging material from the hopper, and means for moving the member axially of its length to vary the discharge of material from the hopper.

6. A dusting machine having in combination, a frame, a hopper supported on the frame, and means including a horizontally disposed longitudinally arranged rotatable and adjustable cutting tool outside and below the hopper for cutting into and discharging material from the hopper.

7. A dusting machine having in combination, a frame, a hopper on the frame provided with an opening in its bottom, means in the hopper substantially parallel with its bottom for moving material in the hopper to the opening, a discharge conduit disposed below the hopper, and a cylindrical cutting member horizontally disposed below the hopper opening between the hopper bottom and conduit for cutting into the material in the hopper and delivering it to said discharge conduit, said cutting member being rotatable on a longitudinal axis, and means for adjusting said cutting member with respect to the hopper opening to vary the amount of material delivered thereby to the conduit.

8. In a dusting machine, the combination of a frame, a hopper having a horizontally disposed flat bottom provided with an opening therein mounted on said frame, means in the hopper for moving the material therein to said opening, a discharge conduit below said opening, and a horizontally disposed, rotatable, cylindrical cutting member located between the hopper and conduit on a longitudinal axis in a manner to provide a closure for the opening in the hopper when stationary but adapted to be rotated to cut into the material in the hopper to deliver it to the discharge conduit.

9. In a dusting machine, the combination of a frame, a hopper having a bottom provided with an opening therein mounted on said frame, a discharge conduit below said opening, and a cylindrical cutting member located between the hopper and conduit, the axis of said member being longitudinally disposed and parallel with the hopper bottom, said member furthermore constituting a closure for the opening in the hopper when stationary, but adapted to be rotated to cut into the material in the hopper to deliver it to the discharge conduit.

In testimony whereof I affix my signature.

LEOPOLD F. BURGER.